(12) United States Patent
Mahy et al.

(10) Patent No.: US 6,912,065 B1
(45) Date of Patent: Jun. 28, 2005

(54) COLOR QUALITY PRINTING USING SEVERAL APPLICATION STATIONS FOR APPLYING THE SAME COLOR

(75) Inventors: Marc Mahy, Wilsele (BE); Dirk Van Hoof, Mortsel (BE)

(73) Assignee: Agfa Gevaert, Antwerp (BE)

( * ) Notice: Subject to any disclaimer, the term of this patent is extended or adjusted under 35 U.S.C. 154(b) by 0 days.

(21) Appl. No.: 09/537,131

(22) Filed: Mar. 29, 2000

Related U.S. Application Data
(60) Provisional application No. 60/138,824, filed on Jun. 14, 1999.

(30) Foreign Application Priority Data

Mar. 31, 1999 (EP) .............................. 99200978

(51) Int. Cl.[7] .............................. G06K 1/00; G06F 15/00
(52) U.S. Cl. ..................... 358/1.9; 358/1.9; 358/502; 358/520; 347/43
(58) Field of Search ................ 358/1.9, 504, 517, 358/502, 520; 347/15, 43

(56) References Cited

U.S. PATENT DOCUMENTS

| | | | | |
|---|---|---|---|---|
| 5,317,425 A | * | 5/1994 | Spence et al. | 358/504 |
| 5,333,069 A | * | 7/1994 | Spence | 358/517 |
| 5,493,321 A | * | 2/1996 | Zwadlo | 347/131 |
| 5,731,818 A | * | 3/1998 | Wan et al. | 345/590 |
| 5,781,206 A | * | 7/1998 | Edge | 347/19 |
| 6,027,199 A | * | 2/2000 | Reed | 347/15 |
| 6,079,824 A | * | 6/2000 | Gotoh | 347/100 |
| 6,134,029 A | * | 10/2000 | Granger | 358/504 |
| 6,172,692 B1 | * | 1/2001 | Huang et al. | 347/43 |
| 6,233,061 B1 | * | 5/2001 | Huang et al. | 358/1.9 |
| 6,459,501 B1 | * | 10/2002 | Holmes | 358/1.9 |
| 2002/0008880 A1 | * | 1/2002 | Dewitte et al. | 358/1.9 |
| 2002/0054178 A1 | * | 5/2002 | Sugimoto et al. | 347/15 |

FOREIGN PATENT DOCUMENTS

| | | | |
|---|---|---|---|
| EP | 0388978 | 9/1990 | B41J/2/205 |
| EP | 0401023 | 12/1990 | H04N/1/40 |

OTHER PUBLICATIONS

"Full–Color Ink–Jet Printer Using Multilevel Ink" by M. Takahashi et al., 1985 SID Digest.

* cited by examiner

*Primary Examiner*—Kimberly Williams
*Assistant Examiner*—Melanie Vida
(74) *Attorney, Agent, or Firm*—Robert A. Sabourin (57) ABSTRACT

An apparatus and a method for making a digital color proof of an image on a surface of a receiving substrate, the apparatus including a plurality of application stations for imagewise applying each a specific type of marking particles to the surface of the receiving substrate, the application stations including a first number $N_1$ of first application stations for applying marking particles of a first, dominant color and a second number $N_2$ of one or more second application stations for applying marking particles of a second, non-dominant color, wherein $N_1$ is larger than $N_2$.

12 Claims, 4 Drawing Sheets

COLOR QUALITY PRINTING USING SEVERAL APPLICATION STATIONS FOR APPLYING THE SAME COLOR

This application Claims the benefit of provisional application No. 60/138,824, filed Sep. 14, 1999.

FIELD OF THE INVENTION

The present invention relates to apparatuses and methods for making reproductions of colour images; the invention especially concerns colour management. The invention is particularly suitable for proofing and for ink-jet printing.

BACKGROUND OF THE INVENTION

A colour proof of a colour image is required for inspection and approval by the printer or his client before the colour image is printed on the production printing press. There are two important reasons to create a proof before printing a given job:

- to check for colour accuracy and resolution;
- to confirm that layout, fonts and other design elements were not lost or deformed by the time the image data reached the output stage.

Very good colour quality of the colour proof is absolutely required.

To make a traditional off-press proof, colour separations of the image (e.g. a cyan, a magenta, a yellow and a black separation) are produced on a substrate which may be photographic film; these colour separations are then used to make the colour proof of the image.

In digital colour proofing, the digital data that represent the colour image are directly sent to a high resolution, high-quality printer that prints the colour proof on a receiving substrate, thus omitting the intermediate step of producing colour separations on a substrate.

Ink-jet printers may be used for digital colour proofing. The Lexmark Optra™ Color 45 ink-jet printer has two application stations for applying cyan ink to the receiving substrate, two stations for magenta ink, one for yellow and one for black ink, which makes a total of six application stations.

When using existing ink-jet printers for colour proofing, the problem is that the quality of the proof, with respect to colour, is not good enough. The insufficient colour quality includes unsatisfactory colour stability and too little or not well spaced colour levels. Moreover, a colour cast may occur in the image and especially in the wedges that are customarily printed near the edges of the proof; colour cast is especially disturbing in neutral or achromatic, i.e. greyish, wedges.

Patent application EP-A-0 388 978 discloses ink-jet printers that use in a first embodiment three black inks but no ink of another colour, and in a second embodiment two cyan, two magenta, two yellow and two black inks. The ink tanks are integrated in the ink-jet head cartridge to provide advantages such as a simple control circuit and more convenience with respect to replacement of the head cartridge; the inks of the same colour are light and dark inks. These ink-jet printers do not offer satisfactory colour quality for proofing purposes.

OBJECTS OF THE INVENTION

It is therefore an object of the present invention to provide an apparatus and a method allowing to make a digital colour proof of a colour image with improved colour quality.

Another object is to provide an apparatus and a method allowing to reproduce a colour image on a receiving substrate with improved colour quality.

DEFINITION AND EXPLANATION OF TERMS

A "receiving substrate" may be, without limitation, a separate sheet or it may be a continuous web; it may be made of paper, of polyethylene coated paper, of plastic, of white poly(ethylene terephtalate), it may be a laminate of paper and plastic; it may be transparent or opaque; several kinds of receiving substrate are described in patent application EP-A-768 577. Preferably, the receiving substrate is a separate sheet made of paper or of another opaque material.

A "marking particle" is a particle that is applied to the receiving substrate by the printing apparatus for reproducing the image. In ink-jet printing, the marking particles are liquid ink drops. In thermal transfer printing and in laser induced melt transfer printing, the marking particles are melted wax ink particles. In electro(stato)graphic printing, the marker particles are toner particles; liquid electrostatographic development (using a dispersion of solid toner particles in a dielectric liquid) as well as dry electrostatographic developers may be used.

CIE $L^*a^*b^*$ space is a three dimensional colour space that is approximately uniform, which means that equal distances in any direction in this space represent colour differences of roughly equal visual magnitudes. More information on CIE $L^*a^*b^*$ space can be found in "The Reproduction of Colour in Photography, Printing & Television" by R. W. G. Hunt, Fountain Press, England, fourth edition, 1987, ISBN 0 85242 356 X, section 8.8; this book is referenced to below as [Hunt]. Marking particles have ($L^*$, $a^*$, $b^*$) colour values, corresponding to three-dimensional co-ordinates, in CIE $L^*a^*b^*$ space. $L^*$ defines lightness: lower $L^*$ values correspond to darker colours and higher $L^*$ values correspond to lighter colours; greyish colours have small absolute values $|a^*|$ and $|b^*|$, i.e. they are 'located near the $L^*$ axis', and their $L^*$ value is in the range from 0 to 100, $L^*=0$ corresponding to black while $L^*=100$ corresponds to white. $a^*$ mainly indicates the green to red value: positive $a^*$ values will appear reddish and negative $a^*$ values appear greenish. $b^*$ mainly indicates the yellow to blue value: positive $b^*$ values are yellowish while negative $b^*$ values are bluish.

The colour values of marking particles, when applied to a receiving substrate (e.g. fused to the receiving substrate in case of toner particles), may be different from the colour values of the original marking particles; therefore, the colour values referred to are those of the marking particles appearing on the receiving substrate. In determining the colour values, the printing apparatus is driven at 100% (which is often binary value 255 or 1023) of the concerned colour and at 0% of the other colours; this determines the amount of marking particles that are applied to the receiving substrate.

An "application station" applies a specific type of marking particles, i.e. marking particles having the same colour values ($L^*$, $a^*$, $b^*$) in CIE $L^*a^*b^*$ space, to a surface of the receiving substrate. A specific type of marking particles may be applied by two or more application stations, but an application station applies just one type of marking particles, not two or more types. The marking particles are applied imagewise to the receiving substrate, so that a reproduction of the image is made.

A "dominant colour" is the colour that has the largest lightness ($L^*$) range in a set of images, representative for the images that are to be reproduced. Usually, the dominant colour is black, but in some cases the dominant colour may be another colour; e.g. if an image only contains cyan and magenta, the dominant colour may be cyan.

A function "a tan 2" is used to calculate the hue-angle $h_{ab}$ of a colour that has (L*, a*, b*) values in CIE L*a*b* colour space. The "hue-angle" $h_{ab}$ is the angle in the colour space between the plane containing the L* and a* axes and the plane containing the L* axis and the colour (see [Hunt], page 119). The function a tan 2 calculates this angle from the values a* and b*, so that a tan $2(a^*,b^*) \leq 0°$ and a tan $2(a^*,b^*) > 360°$. The value a tan $2(a^*,b^*)$ can be calculated as follows, using the well known arc tangent function, denoted as arc tan(x) that returns a value arc tan(x)>−90° and arc tan(x)<90°:

if a*>0 and b*≦0, then $h_{ab}$=a tan $2(a^*,b^*)$=arc tan(b*/a*)
if a*=0 and b*>0, then $h_{ab}$=a tan $2(0,b^*)$=90°
if a*<0, then $h_{ab}$=a tan $2(a^*,b^*)$=arc tan(b*/a*)+180°
if a*=0 and b*<0, then $h_{ab}$=a tan $2(0,b^*)$=270°
if a*>0 and b*<0, then $h_{ab}$=a tan $2(a^*,b^*)$=arc tan(b*/a*)+360°
if a*=0 and b*=0, then $h_{ab}$=a tan $2(0,0)$ is undefined.

The hue-angle difference "d" between two colours could now be calculated as $|h_{ab,2}-h_{ab,1}|$, wherein "|a|" denotes the absolute value of a. However, if e.g. $h_{ab,2}$=0° and $h_{ab,1}$=359°, the difference d would yield −359° and not 1°. Therefore, the hue-angle difference is calculated as:

$$d=|h_{ab,2}-h_{ab,1}+k*360°|$$

wherein the number k may equal −1, 0 or +1, and is chosen so that the difference d is smallest. For example, if $h_{ab,2}$=0° and $h_{ab,1}$=359°, then k=+1 and d=1°.

CIE lightness L* is calculated (see [Hunt], page 116) as $L^*=116*(Y/Y_n)^{1/3}-16$ for $Y/Y_n \leq 0.008856$, and
$L^*=903.3*(Y/Y_n)$ for $Y/Y_n<0.008856$ when determined under an illuminant, preferably standard daylight D50 as defined by CIE, and where $Y_n$ is the Y tristimulus value of the reference white being used; the reference white may be 'the white of the paper', or, more generally, the Y tristimulus value of the receiving substrate.

SUMMARY OF THE INVENTION

Figure 1:
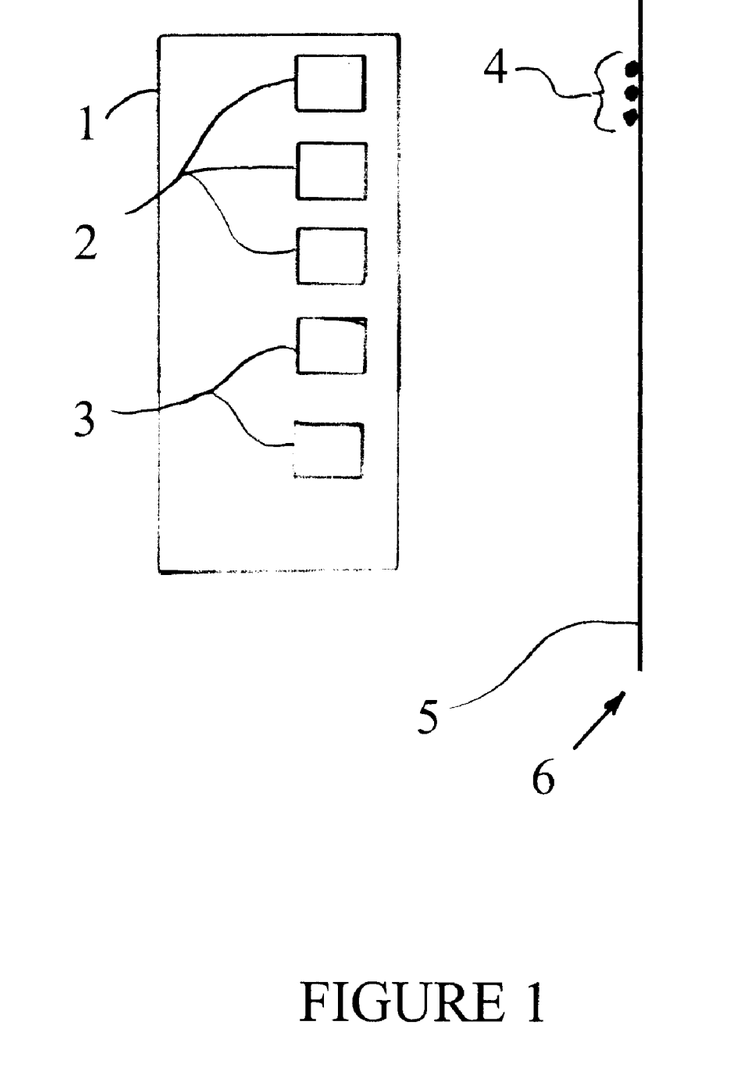
FIG. 1 depicts a preferred embodiment of a printing apparatus in accordance with the principles of the invention.
Figure 2:
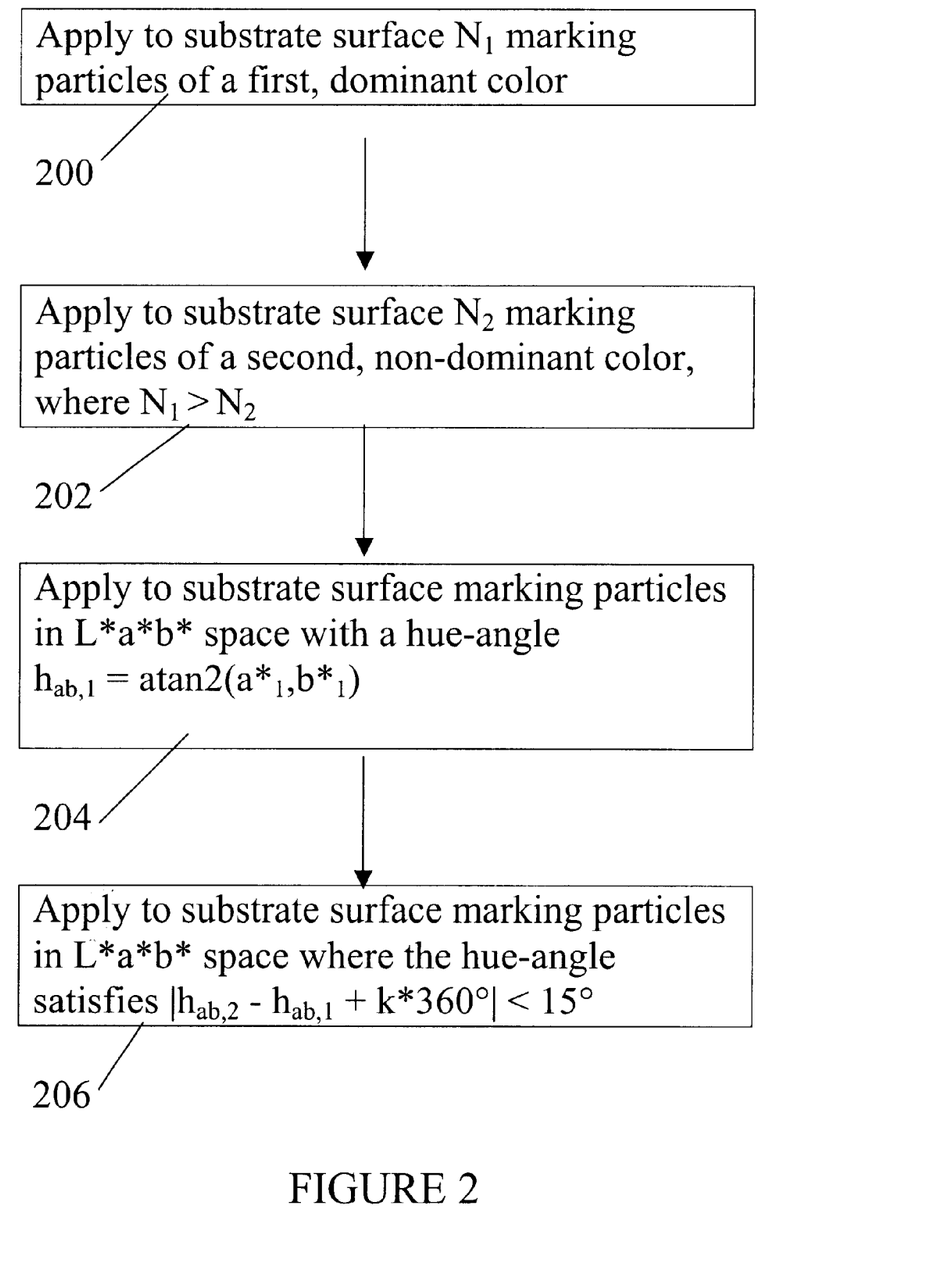
FIG. 2 is a flowchart diagram of one embodiment of a method in accordance with the principles of the invention.
Figure 3:
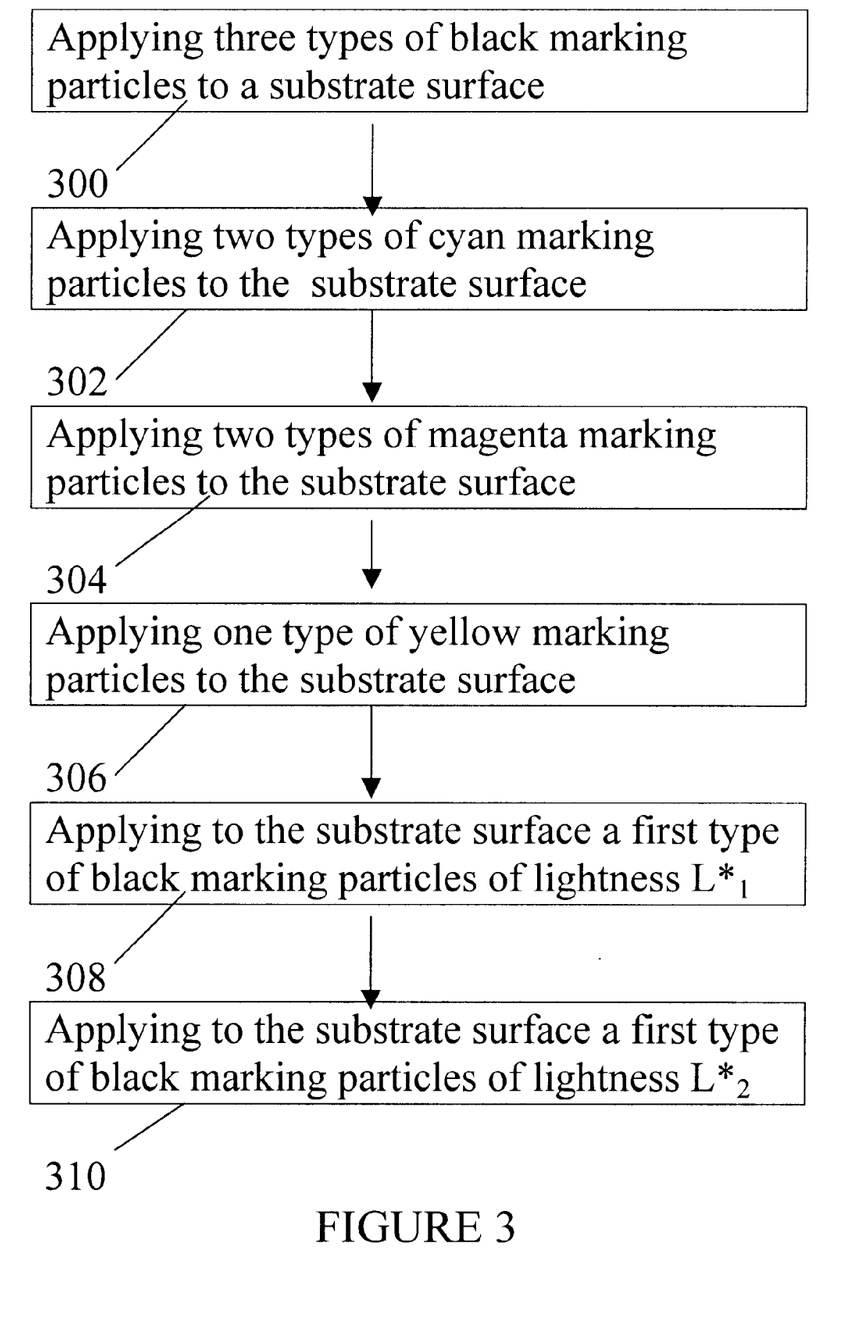
FIG. 3 is a flowchart diagram of another embodiment of a method in accordance with the principles of the invention.
Figure 4:
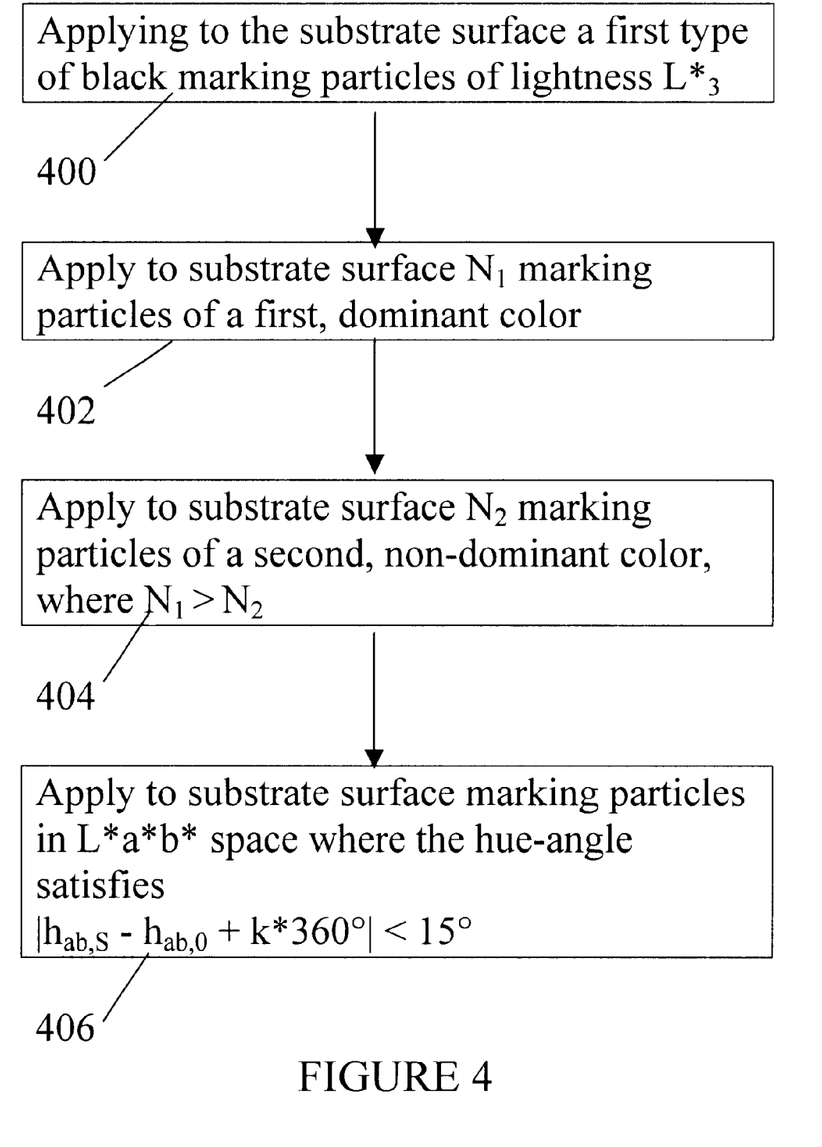
FIG. 4 is a flowchart diagram of yet another embodiment of a method in accordance with the principles of the invention.

The above mentioned objects are realised by an apparatus 1 (see also FIG. 1) that prints a plurality of colours that include a dominant colour and at least one other colour, wherein the number of application stations 2 for the dominant colour is larger than the number of application stations 3 for at least one other colour. The application stations 2, 3 apply marking particles 4 to a surface 5 of a receiving substrate 6.

The above mentioned objects are also realised by a method that comprises the steps of:
  imagewise applying a number of types of marking particles of a dominant colour;
  imagewise applying another number of types of marking particles of a non-dominant colour;
so that the obtained digital colour proof contains more types of marking particles of the dominant colour than types of the nondominant colour.

Preferably, when applying two or more types of marking particles of the same colour, these include different types of marking particles, i.e. marking particles that have different (L*, a*, b*) colour values. Two types of marking particles of the dominant colour may e.g. be black and grey, or dark cyan and light cyan. When applying marking particles, the same type of marking particles, e.g. light cyan, may also be applied by two or more application stations.

In the method of the present invention, the types of marking particles may be applied in any order. As an example, suppose that the dominant colour is black and the non-dominant colour is cyan, and that three types of black marking particles $K_1$, $K_2$ and $K_3$ are applied and two types of cyan particles $C_1$ and $C_2$, then the marking particles may be applied in the order $K_1$, $K_2$, $K_3$, $C_1$, $C_2$, or in the order $C_1$, $K_1$, $K_3$, $C_2$, $K_2$, or in any other possible order.

In a preferred embodiment of the invention, the printing apparatus has application stations for applying cyan, magenta, yellow and black marking particles. In a more preferred embodiment, three application stations are used for applying black marking particles, two are used for cyan, two for magenta and one for yellow.

In another preferred embodiment of the invention, the dominant colour is black and the black marking particles have a* and b* values satisfying specific relations, stated below, so that the marking particles are "really black", "really dark grey" etc., i.e. they are substantially achromatic.

In yet another preferred embodiment of the invention, the hue-angles $h_{ab,1}$ and $h_{ab,2}$ of two types of marking particles satisfy specific relations, stated below, so that smooth colour transitions may be obtained; e.g., smooth colour transitions may be obtained in an image part that is predominantly, but not uniformly, cyan, for dark cyan marking particles and light cyan marking particles that satisfy the concerned relations.

Further advantages and embodiments of the present invention will become apparent from the following description and drawings.

BRIEF DESCRIPTION OF THE DRAWINGS

The invention is described with reference to the accompanying drawings.

DETAILED DESCRIPTION OF THE INVENTION

Colour proofing requires very high colour quality. An insufficient number of colour levels or colour levels that are not well spaced in a proof, or more generally in a reproduced image, may result in insufficient perceived quality to an observer. The number of colour levels and their spacing is however more important for some colours than for other ones; usually, for a high perceived quality, the dominant colour is the most important one in this respect, while in many images yellow may be the least important colour. The lightness range L* of the concerned colour in a set of images, representative for the images that are to be reproduced, is an important factor in determining the required number of colour levels and their spacing.

In a preferred embodiment according to the invention, the number of application stations for marking particles of the dominant colour is larger than the number of application stations for at least one other, non-dominant colour. An advantage is that the number of colour levels for the dominant colour may be large.

High quality colour printing and colour proofing in particular requires very good colour stability. In printing images on a production press, colour stability depends on press fluctuations such as fluctuations of the applied ink quantities and on other factors; colour stability is discussed in patent application EP-A-0 763 928. Especially when printing with the traditional colours cyan, magenta, yellow and black, the use of relatively more black, e.g. via GCR or gray component replacement or via UCR or under colour removal, is beneficent for improving colour stability, since an unbalance in cyan, magenta or yellow will then cause a smaller colour shift.

In another preferred embodiment according to the invention, the dominant colour is black and two or more types of black marking particles are used that have a* and b* values of which the absolute values satisfy the following inequalities:

$$|a^*|<K \text{ and } |b^*|<K \quad (1)$$

wherein K equals 2, preferably 1.5, more preferably 1. An advantage of marking particles satisfying the inequalities (1) is that they are "really black", "really dark grey" etc., i.e. they are substantially achromatic. If a number $N_K>2$ of types of black marking particles are used, then in this embodiment at least two types of black marking particles satisfy the inequalities (1), preferably three types, etc. and most preferably all $N_k$ types satisfy the inequalities (1).

In a more preferred embodiment according to the invention, there are at least three types of black marking particles, that satisfy the relation (1), and of which three types have lightness values of respectively $L^*_1$, $L^*_2$ and $L^*_3$, satisfying the following inequalities:

$$L^*_3<20, L^*_3<L^*_2<60, L^*_1>80 \quad (2)$$

wherein $L^*_1$, $L^*_2$ and $L^*_3$ are preferably determined relative to "the white of the receiving substrate", which means that, in the above mentioned calculation of L*, the quantity Yn is set to the tristimulus value $Y_{rec}$ of the receiving substrate (see the above mentioned calculation of L*, under the "Definition and Explanation of Terms"). Even more preferably, $L^*_1$, $L^*_2$ and $L^*_3$ satisfy the inequalities stated above, and moreover:

$$L^*_1>85 \text{ and } |L^*_2-L^*_3|<|L^*_2-L^*_1| \quad (3)$$

An advantage of black marking particles satisfying the relations (1) for a*, b* and preferably the relations (2), more preferably also the relations (3) for $L^*_1$, $L^*_2$ and $L^*_3$, is that many, well spaced colour levels may be obtained, allowing very good colour quality. Another advantage is that neutral, i.e. greyish, wedges may be reproduced without visible colour cast. Yet another advantage is that very good colour stability may be obtained (see above for the discussion on colour stability and the role of black therein).

Another factor that influences colour levels, especially their relative position and their spacing, is the used screening algorithm, which may be an error diffusion algorithm.

Black marking particles having a lightness $L^*_3$ satisfying inequality (2), preferably also inequality (3), and satisfying the inequalities (1) for a* and b*, may be used to reproduce text, which is advantageous since the colour differences of such text with respect to text printed by a traditional offset press are extremely small.

In yet another preferred embodiment of the invention, the hue-angles $h_{ab,1}$ and $h_{ab,2}$ of two types of marking particles satisfy the inequality:

$$|h_{ab,2}-h_{ab,1}+k^*360°|<\text{alpha} \quad (4)$$

for a number k that may equal −1, 0 or +1, wherein alpha equals 15°, preferably 10°, more preferably 5°, still more preferably 3° and most preferably 1.5°. Two types of marking particles satisfying relation (4), e.g. dark cyan and light cyan marking particles, offer the advantage of smooth colour transitions. Take for example a cyan wedge with adjoining sets of patches: a first set of patches, that is printed using only light cyan marking particles, and a second set of patches, that is printed using light and dark cyan marking particles that satisfy relation (4). In this wedge, the transition between the first set and the second set of patches will be smooth. On the contrary, if the hue-angle difference of e.g. the light cyan and the dark cyan marking particles is too large, a transition, possibly even a step-like transition, between the first set and the second set of patches may be clearly visible. The transition may be visible as a banding effect if the marking particles are small enough or as noise if the marking particles are larger. The value of alpha for which a transition becomes visible depends upon the colour values (L*, a*, b*); it is e.g. different for yellow and for cyan. If a plurality of types of marking particles of the same colour are used in reproducing the image, e.g. four types of cyan marking particles, then two types may satisfy relation (4), more preferably three types and most preferably all types of marking particles of the same colour satisfy relation (4). Preferably, all types of marking particles of other colours than black satisfy relation (4), colour per colour; e.g. all types of cyan marking particles satisfy relation (4), all types of magenta particles, all types of yellow particles (provided, of course, there are at least two types of marking particles of the concerned colour).

In another preferred embodiment according to the invention, the apparatus comprises a number $N_K$ of application stations for applying black marking particles, a number $N_C$ of application stations for applying cyan marking particles, a number $N_M$ of application stations for applying magenta marking particles and a number $N_Y$ of application stations for applying yellow marking particles, satisfying the following inequalities:

$$N_K>N_C, N_K>N_M, N_C>N_Y \text{ and } N_M>N_Y \quad (5)$$

An advantage of this embodiment is that most application stations are used for applying black marking particles, black having, in many images, usually the largest L* range, and that the least application stations are used for yellow, yellow usually having the smallest L* range.

In yet another preferred embodiment of the invention, $N_K=3$, $N_C=N_M=2$ and $N_Y=1$. This embodiment requires only eight application stations; three application stations are used for black, which usually has the largest L* range, as mentioned above; yellow marking particles are applied by only one application station, which is sufficient since yellow is usually the colour that is the least critical with respect to fluctuations and disturbances; two application stations are used for cyan and two for yellow, which is also sufficient for these colours. Thus, an apparatus according to this embodiment allows to reproduce a colour image on a receiving substrate with very good colour quality, while keeping the cost relatively low, since only five application stations are used for cyan, magenta and yellow; using more application stations would increase the cost of the apparatus and also the cost of the reproduced image, since more types of marking particles, e.g. liquid ink, would be used.

In another preferred embodiment of the invention, the numbers of application stations satisfy the inequalities (5), while types of marking particles satisfy one or more, preferably all, of the relations mentioned above, i.e. the relations (1) for a*, b* for black, the relations (2) and preferably also (3) for $L^*_1$, $L^*_2$ and $L^*_3$ for black, and the hue-angle inequalities (4) for cyan, for magenta, for yellow.

In the most preferred embodiment of the invention, the numbers of application stations are $N_K=3$, $N_C=N_M=2$ and $N_Y=1$, as mentioned above, and moreover all black marking particles satisfy the relations (1) for a*, b* for black, the relations (2) and (3) for $L^*_1$, $L^*_2$ and $L^*_3$ for black, the hue-angle inequalities (4) for cyan and the hue-angle inequalities (4) for magenta.

In another embodiment of the invention, the numbers of application stations satisfy the inequalities $N_K>N_Y$, but $N_C>N_K$, while preferably satisfying one or more, more preferably all, of the relations mentioned above, i.e. the relations (1) for a*, b* for black, the relations (2) and preferably also (3) for $L^*_1$, $L^*_2$ and $L^*_3$ for black, and the hue-angle inequalities (4) for cyan, for magenta, for yellow. In this embodiment, more application stations for cyan are used than in the most preferred embodiment of the invention, which is less favourable with respect to cost but which maintains the advantages of the invention with respect to colour quality. Of course, instead of using more cyan application stations, more magenta, more yellow, . . . stations could be used.

In yet another embodiment of the invention, there is a relation between the colour values of marking particles that are used to make a digital proof of an image and the colour values of offset printing inks that are used to print this image on an offset printing press. The colour values of an offset printing ink are indicated by $(L^*_O, a^*_O, b^*_O)$ and the corresponding hue-angle by $h_{ab,O}=a \tan 2(a^*_O,b^*_O)$. If:

$$(a^*_O)^2+(b^*_O)^2>R2 \qquad (6)$$

wherein R2 equals 8, preferably 4, more preferably 2 and most preferably 1.5, then the offset printing ink has a non-black colour component. In a preferred embodiment, for each of the offset printing inks that have $a^*_O$ and $b^*_O$ values satisfying the relation (6), the apparatus of the invention has an application station for applying marking particles having $(L^*_S, a^*_S, b^*_S)$ colour values and a hue-angle $h_{ab,S}=a \tan 2(a^*_S,b^*_S)$ satisfying the inequality:

$$|h_{ab,S}-h_{ab,O}+k*360°|<alpha \qquad (7)$$

for a number k that may equal −1, 0 or +1, wherein alpha equals 15°, preferably 10°, more preferably 5°, still more preferably 3° and most preferably 1.5°. Preferably, all types of marking particles of other colours than black satisfy relation (7) with respect to offset printing inks, colour per colour; e.g. all types of cyan marking particles applied by the application stations satisfy relation (7), all types of magenta particles, all types of yellow particles (of course other colours may be used by the offset printing press, such as the six colours of the Hexachrome™ process, by Pantone® Inc.). Preferably, the colour values of the black marking particles used to make the proof satisfy the inequalities (1) for |a*|and |b*|.

An advantage of using marking particles satisfying relation (7) with respect to offset printing inks is that the colour differences between the digital proof and the image printed on the offset press may be very small, since the colours are very 'similar' to the offset colours. The value of alpha, for which the colour differences are very small, depends upon the colour values (L*, a*, b*); it is e.g. different for yellow and for cyan. The advantage of small colour differences with respect to offset is that the measures that can be taken to change or to improve the colours for the digital proof, when using the colour management system, are very similar to the measures that the printer can take when printing on the production offset printing press.

In another embodiment of the invention, the hue-angles $h_{ab,O}$ of offset printing inks in the relation (7) are replaced by the hue-angles of marking particles of another production printing process, or of a traditional off-press proofing system such as Agfa's Agfaproof™, or of another selected reproduction system, as known in the art, for reproducing the image. Preferably, all types of marking particles of other colours than black of the digital proofing system satisfy relation (7) with respect to the marking particles of the selected reproduction system, colour per colour. The advantage is again, as in the case of offset, that small colour differences may be obtained between the digital proof and the image reproduced by the selected reproduction system.

In the embodiment of the invention mentioned above wherein the number of application stations satisfy the relation (5), the marking particles may also satisfy the relation (7) with respect to marking particles of a selected image reproduction system.

The invention may be applied to ink-jet printing. The apparatus of the invention is then an ink-jet printing device and the marking particles are liquid ink drops. The invention is especially suitable for ink-jet printing, because in ink-jet printing the black ink usually has a very small L* value. Therefore, when using only such a black ink with a very small L* value, the image contrast of the digital proof may be too high. Moreover, when using only such black ink and when applying a little black to a patch of 100% or nearly 100% yellow in the image, to make the yellow more greyish, heavy black dots are visible in the patch, which is very disturbing. Both problems are solved by using an ink-jet printing device according to the invention. Another advantage of using ink-jet is that, as may be read in the literature, ink-jet printing heads are available or will be available in the near future from Epson, that offer a resolution of 1200 dpi (i.e. 1200 dots per inch, or 47 dots per mm). Such a high resolution is advantageous for digital colour proofing with very good colour quality. Yet another advantage is that using ink-jet for proofing is relatively inexpensive, when compared with other technologies, such as electro(stato)graphic printing. Another advantage is that the same type of marking particles may be applied two or even more times to the receiving substrate, by moving the printing head two or more times over the same part of the receiving substrate; this is an alternative to applying the same type of marking particles, e.g. light cyan, by two or more application stations (which is an embodiment mentioned hereinbefore). Applying the same type of marking particles twice may provide another colour, e.g. applying light cyan twice may provide a colour 'in-between' light cyan and dark cyan.

As stated above, the invention may also be applied to other image reproduction processes such as thermal transfer printing, laser induced melt transfer printing, electro(stato) graphic printing.

The invention is also especially suitable for digital colour proofing, because of the high requirements of colour proofing with respect to colour quality. The invention may also be used to make high-quality prints.

The invention is not limited to the embodiments described hereinbefore. The marking particles may have the traditional four colours cyan, magenta, yellow and black; they may have other colours; they may have less or more than four colours; examples are the six colour-system of the Hexachrome™ process, by Pantone® Inc, and duotone colours, which are two shades of the same colour. The invention may be combined with multilevel halftoning techniques, as disclosed e.g. in patent applications EP-A-0 682 438 and EP-A-0 634 862. The invention includes applying marking particles to a surface of a receiving substrate; the invention also includes printing on both sides of the receiving substrate, i.e. double sided printing.

EXAMPLE
(Best mode of the Invention)

An ink-jet printer is used to make a digital colour proof. The resolution of the printing heads is 1200 dpi. Eight application stations each apply a different type of printing ink on an AJNU (AgfaJet New Universal) 195 RC receiving substrate. The eight different applied printing inks are:

$K_1$: a first black ink, having colour values ($L^*_{K1}$, $a^*_{K1}$, $b^*_{K1}$);

$K_2$: a second black ink, having colour values ($L^*_{K2}$, $a^*_{K2}$, $b^*_{K2}$);

$K_3$: a third black ink, having colour values ($L^*_{K3}$, $a^*_{K3}$, $b^*_{K3}$);

$C_1$: a first cyan ink, having colour values ($L^*_{C1}$, $a^*_{C1}$, $b^*_{C1}$);

$C_2$: a second cyan ink, having colour values ($L^*_{C2}$, $a^*_{C2}$, $b^*Z_{C2}$);

$M_1$: a first magenta ink, having colour values ($L^*_{M1}$, $a^*_{M1}$, $b^*_{M1}$);

$M_2$: a second magenta ink, having colour values ($L^*_{M2}$, $a^*_{M2}$, $b^*_{M2}$);

Y: yellow ink, having colour values ($L^*_Y$, $a^*_Y$, $b^*_Y$).

The black marking particles satisfy the above stated relations (1):

$$|a^*_{K1}|<K; |b^*_{K1}|<K; |a^*_{K2}|<K; |b^*_{K2}|<K; |a^*_{K3}|<K; |b^*_{K3}|<K.$$

The black marking particles satisfy the above stated relations (2) and (3):

$$L^*_{K3}<20; L^*_{K1}>85; L^*_{K3}<L^*_{K2}<60;$$

$$|L^*_{K2}-L^*_{K3}|<L^*_{K2}-L^*_{K1}|.$$

The cyan marking particles satisfy the above stated relation (4):

$$|h_{ab,C2}-h_{ab,C1}+k*360°|<\text{alpha}.$$

The magenta marking particles satisfy the above stated relation (4):

$$|h_{ab,M2}-h_{ab,M1}+k*360°|<\text{alpha}.$$

Having described in detail preferred embodiments of the current invention, it will now be apparent to those skilled in the art that numerous modifications can be made therein without departing from the scope of the invention as defined in the appending claims.

What is claimed is:

1. An apparatus for making a digital colour proof of an image on a surface of a receiving substrate, the apparatus comprising a plurality of application stations, each of said application stations being for imagewise applying one specific type of marking particles to said surface of said receiving substrate, said application stations including a first number $N_1$ of first application stations for applying marking particles of a first, dominant colour and a second number $N_2$ of one or more second application stations for applying marking particles of a second, non-dominant colour, wherein said first number $N_1$ is larger than said second number $N_2$, one of said application stations used for applying marking particles having ($L^*_1$, $a^*_1$, $b^*_1$) colour values in CIE L*a*b* space with a hue-angle $h_{ab,1}=a \tan 2(a^*_1,b^*_1)$ and another of said application stations used for applying marking particles having ($L^*_2$, $a^*_2$, $b^*_2$) colour values in CIE L*a*b* space with a hue-angle $h_{ab,2}=a \tan 2(a^*_2,b^*_2)$, said hue-angles satisfying the inequality $$|h_{ab,2}-h_{ab,1}+k*360°|<15°$$

for a number k selected from the group of −1, 0 and +1.

2. The apparatus according to claim 1 wherein said apparatus is an ink-jet printing device and said marking particles are liquid ink drops.

3. The apparatus according to claim 1 wherein said marking particles of said first, dominant colour are black marking particles having a* and b* values of which the absolute values satisfy the inequalities $|a^*|<2$ and $|b^*|<2$ when expressed in the CIE L*a*b* space.

4. The apparatus according claim 1 wherein said second, non-dominant colour is yellow, the apparatus further comprising a number $N_C$ of application stations for applying cyan marking particles and a number $N_M$ of application stations for applying magenta marking particles, satisfying the following inequalities:

$$N_1>N_C, N_1>N_M, N_C>N_2 \text{ and } N_M>N_2.$$

5. The apparatus according to the claim 4 wherein $N_1=3$, $N_C=N_M=2$ and $N_2=1$.

6. The apparatus according to the claim 5 wherein said receiving substrate has a tristimulus value $Y_{rec}$ according to the CIE and wherein three of said application stations for applying black marking particles are for applying a first type of black marking particles having a CIE lightness of $L^*_1$, a second type of black marking particles having a CIE lightness of $L^*_2$ and a third type of black marking particles having a CIE lightness of $L^*_3$, satisfying the following inequalities:

$$L^*_3<20, L^*_3<L^*_2<60, L^*_1>80,$$

when using, in determining $L^*_1$, $L^*_2$ and $L^*_3$, said tristimulus value $Y_{rec}$ of said receiving substrate as the CIE's tristimulus value of reference white.

7. An apparatus for making, on a surface of a receiving substrate, a digital colour proof of an image to be reproduced by a reproduction system, the apparatus comprising a plurality of application stations, each of said application stations being for imagewise applying one specific type of marking particles to said surface of said receiving substrate, said application stations including a first number $N_1$ of first application stations for applying marking particles of a first, dominant colour and a second number $N_2$ of one or more second application stations for applying marking particles of a second, non-dominant colour, wherein said first number $N_1$ is larger than said second number $N_2$, said reproduction system using reproduction marking particles having ($L^*_O$, $a^*_O$, $b^*_O$) colour values with a hue-angle $h_{ab,O}=a \tan 2(a^*_O, b^*_O)$ in CIE L*a*b* space, wherein, for each of said reproduction marking particles having $a^*_O$ and $b^*_O$ values satisfying the inequality $(a^*_O)^2+(b^*_O)^2>8$, said apparatus has an application station for applying marking particles having ($L^*_S$, $a^*_S$, $b^*_S$) colour values with a hue-angle $h_{ab,S}$=a tan $2(a^*_S,b^*_S)$ satisfying the inequality $$|h_{ab,S}-h_{ab,O}+k*360°|<15°$$

for a number k selected from the group of −1, 0 and +1.

8. A method for making a digital colour proof of an image, the method comprising:

imagewise applying a first number $N_1$ of types of marking particles of a first, dominant colour to a surface of a receiving substrate;

imagewise applying a second number $N_2$ of one or more types of marking particles of a second, non-dominant colour to said surface of said receiving substrate, wherein said first number $N_1$ is larger than said second number $N_2$ in the digital colour proof obtained by the method;

imagewise applying to said surface of said receiving substrate marking particles having ($L^*_1, a^*_1, b^*_1$) colour values in CIE L*a*b* space with a hue-angle $h_{ab,1}$=a tan $2(a^*_1,b^*_1)$; and imagewise applying to said surface of said receiving substrate marking particles having ($L^*_2, a^*_2, b^*_2$) colour values in CIE L*a*b* space with a hue-angle $h_{ab,2}$=a tan $2(a^*_2,b^*_2)$; wherein said hue-angles satisfy the inequality $$|h_{ab,2}-h_{ab,1}+k*360°|<15°$$

for a number k selected from the group of −1, 0 and +1.

9. The method according to claim 8, wherein said marking particles are supplied by an ink-jet printing device.

10. The method according to claim 8, further comprising:

using black marking particles having a* and b* values of which the absolute values satisfy the inequalities |a*|<2 and |b*|<2, when expressed in the CIE L*a*b* space, for obtaining said first, dominant colour.

11. A method for making a digital colour proof of an image, the method comprising:

imagewise applying three types of black marking particles to a surface of a receiving substrate;

imagewise applying two types of cyan marking particles to said surface of said receiving substrate;

imagewise applying two types of magenta marking particles to said surface of said receiving substrate;

imagewise applying one type of yellow marking particles to said surface of said receiving substrate imagewise applying to said surface of said receiving substrate a first type of black marking particles having a CIE lightness of $L^*_1$;

imagewise applying to said surface of said receiving substrate a second type of black marking particles having a CIE lightness of $L^*_2$;

imagewise applying to said surface of said receiving substrate a third type of black marking particles having a CIE lightness of $L^*_3$;

wherein $L^*_1$, $L^*_2$ and $L^*_3$ satisfy the following inequalities:

$$L^*_3<20, L^*_3<L_2<60, L^*_1>80,$$

when using, in determining $L^*_1$, $L^*_2$ and $L^*_3$, a tristimulus value $Y_{rec}$—according to the CIE—of said receiving substrate as the CIE's tristimulus value of reference white.

12. A method for making a digital colour proof of an image to be reproduced by a reproduction system, said reproduction system using reproduction marking particles having ($L^*_O$, $a^*_O$, $b^*_O$) colour values with a hue-angle $h_{ab,O}$=a tan $2(a^*_O,b^*_O)$ in CIE L*a*b* space, the method comprising:

imagewise applying a first number $N_1$ of types of marking particles of a first, dominant colour to a surface of a receiving substrate;

imagewise applying a second number $N_2$ of one or more types of marking particles of a second, non-dominant colour to said surface of said receiving substrate, wherein said first number $N_1$ is larger than said second number $N_2$ in the digital colour proof obtained by the method imagewise applying to said surface of said receiving substrate marking particles having ($L^*_S$, $a^*_S$, $b^*_S$) colour values with a hue-angle $h_{ab,S}$=a tan $2(a^*_S,b^*_S)$ satisfying the inequality $$|h_{ab,S}-h_{ab,O}+k*360°|<15°$$

for a number k selected from the group of −1, 0 and +1;

for each of said reproduction marking particles having $a^*_O$ and $b^*_O$ values satisfying the inequality $(a^*_O)^2+(b^*_O)^2>8$.

* * * * *